Patented June 14, 1932

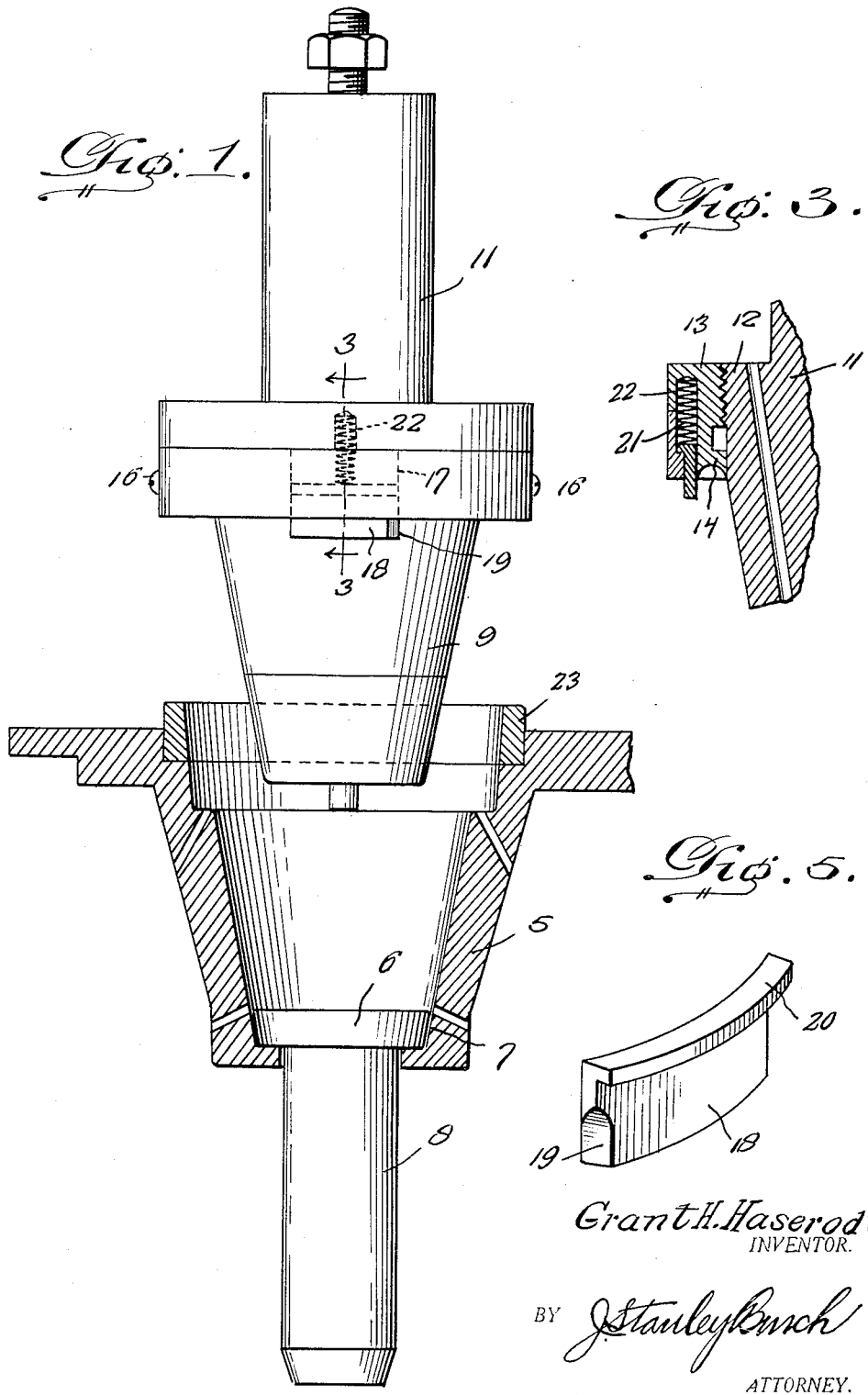

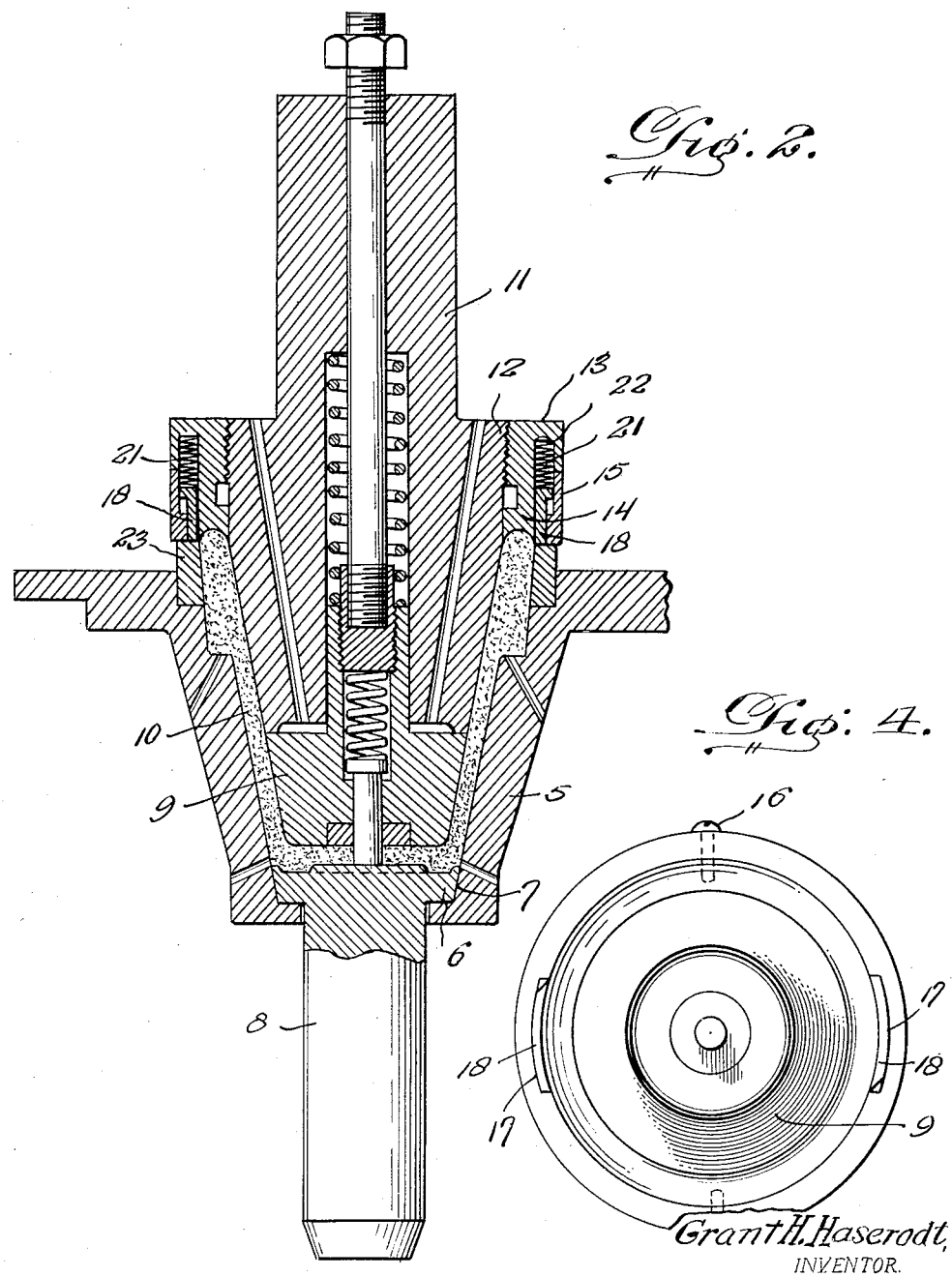

1,863,114

UNITED STATES PATENT OFFICE

GRANT H. HASERODT, OF MOUNT GILEAD, OHIO, ASSIGNOR TO THE FLORENCE POTTERY COMPANY, OF MOUNT GILEAD, OHIO

MOLDING MACHINE

Application filed October 28, 1929. Serial No. 403,063.

This invention relates to machines for molding and forming flower pots and the like of plastic material.

It is the practice to place plastic material in a mold of proper shape to form the outside of a flower pot, and then to introduce into the mold a plunger of proper shape to form the inside of the flower pot. The plunger has also been provided with a ring fitting between the plunger and the upper edge of the mold for forming or shaping the top or upper end of the molded flower pot. In operation, it has been found that the plastic material is squeezed out between the top shaping ring and the mold, forming a fin or rib on the molded pot, which, if not earlier removed, must be shipped off after the pot is baked or otherwise set or hardened.

It has been proposed to remove the fin or rib by means of knives carried by the plunger, the plunger and knives rotating relative to the mold during the forming operation, whereby the knives cut away the excess plastic material escaping between the mold and the top shaping ring. In practice, it is found that the knives are subject to rapid wear, and frequent replacement is necessary. An important feature of this invention, therefore, relates to the form and mounting of the knives, whereby the same may continue to properly function until worn to a considerable extent, but whereby the knives may be readily replaced by new ones when found necessary.

A further object is to provide a form and mounting of the knives which is extremely simple, compact and durable.

The invention consists in the novel form combination and arrangement of parts hereinafter more fully described, shown in the accompanying drawings, and claimed.

In the drawings:

Figure 1 shows the mold and plunger of a molding machine, the mold being in vertical section, and the plunger being raised and provided with trimming knives in accordance with this invention.

Figure 2 is a vertical section of the mold and plunger shown in Figure 1, as they appear when forming the inside of a flower pot.

Figure 3 is a fragmentary vertical section through the plunger and one of the knives, substantially on line 3—3 of Figure 1.

Figure 4 is a bottom plan view of the plunger shown in Figure 1; and

Figure 5 is a perspective view of one of the trimming knives.

Referring in detail to the drawings, 5 indicates a conventional form of mold having an internal surface of substantially frusto-conical shape corresponding to the outer face of the molded pot. The smaller end of the mold is perforated for reception of the base member 6, formed at its top to correspond with the configuration desired for the outside of the base of the pot and formed at its outer edge to seat within the lower portion of the mold at 7. The base member 6 has a depending stem 8 for use in a well known manner, whereby the base member may be pushed upwardly within the mold to free the pot from the latter after said pot has been molded.

To form the inside of the pot, a plunger 9 is provided to be depressed into the mold to force the plastic material into the desired shape as shown at 10. This plunger is caused to rotate in the usual way as it is depressed into the mold so as to facilitate the flow of the plastic material into shape and to actuate the fin or rib removing knives, to be described. The plunger 9 has a shank 11 and a threaded larger upper end portion 12, and screwed on the threaded portion 12 is a ring or collar 13 having a depending flange 14 whose lower edge is formed according to the configuration desired for the top or upper end of the pot.

The lower portion of ring 13 is externally reduced in diameter to form the flange 14, and removably fitted about said flange is a knife retaining ring 15 which is held in place by screws 16 passed through opposite sides of such ring 15 and screwed into the flange 14. Wide vertical grooves or recesses 17 are formed opposite each other in the inner surface of the ring 15, and fitted in these recesses for vertical sliding movement are horizontally curved or arcuate trimming knives 18 having flat horizontal lower edges and each sharpened at 19 on one vertical edge. The recesses 17 are outwardly undercut at the top to slidably receive the outwardly directed flanges 20 on the upper edges of the knives 18, whereby the downward movement of said knives is limited. The knives 18 are yieldingly projected below the bottom of flange 14 and ring 15 by means of helical springs 21 which bear on top of the knives and have their upper ends seated in sockets 22 provided in the bottom of ring or collar 13 outwardly of the flange 14 and in alinement with the recesses 17. At the top of the mold is a ring 23 against which the lower edges of the knives bear as urged by the springs 21. It will thus be noted that the knives are resiliently mounted to yield away from the mold parallel to the axis of the plunger, and as the knives wear away at their lower edges they will continue to function properly until worn very short. Moreover, the construction is very simple, compact and durable, while renewal of the knives may be readily effected when desired. It is apparent that as the plunger rotates, the material squeezed out between the mold and the top forming ring 13 passes out over the ring 23 where it is cut away by the knives as fast as it is extruded.

Minor changes are contemplated within the spirit and scope of the invention as claimed.

What I claim as new is:

1. A device of the class described comprising a mold, a rotary plunger movable axially into and out of the mold, a top-forming collar movable with the plunger and having an externally reduced lower portion, a retaining ring fitted and removably secured on the reduced lower portion of said top-forming collar, and a plurality of knives carried by and yieldably slidable relative to said retaining ring to cut away plastic material extruded out between said mold and said top-forming collar as said plunger is rotated.

2. A device of the class described comprising a mold, a rotary plunger movable axially into and out of the mold, a top-forming collar movable with the plunger and having an externally reduced lower portion, a retaining ring fitted and removably secured on the reduced lower portion of said top-forming collar, and a plurality of knives carried by and yieldably slidable relative to said retaining ring to cut away plastic material extruded out between said mold and said top-forming collar as said plunger is rotated, said retaining ring having recesses in the inner face thereof in which the knives are mounted, said recesses being undercut at the top, and flanges on the tops of the knives arranged in the undercut top portions of said recesses to limit the downward movement of the knives relative to the retaining ring.

3. A device of the class described comprising a mold, a rotary plunger movable axially into and out of the mold, a top-forming collar movable with the plunger and having an externally reduced lower portion, a retaining ring fitted and removably secured on the reduced lower portion of said top-forming collar, and a plurality of knives carried by and yieldably slidable relative to said retaining ring to cut away plastic material extruded out between said mold and said top forming collar as said plunger is rotated, said retaining ring having recesses in the inner face thereof in which the knives are mounted, said recesses being undercut at the top, and flanges on the tops of the knives arranged in the undercut top portions of said recesses to limit the downward movement of the knives relative to the retaining ring, said top-forming collar having sockets in the bottom thereof registered with said recesses of the retaining ring, and springs seated in said sockets and bearing on top of the knives to yieldingly project the same below said retaining ring and said collar.

4. A device of the class described comprising a mold, a rotary plunger movable axially into and out of the mold, a top-forming collar movable with the plunger and having an externally reduced lower portion, a retaining ring fitted and removably secured on the reduced lower portion of said top-forming collar, and a plurality of knives carried by and yieldably slidable relative to said retaining ring to cut away plastic material extruded out between said mold and said top-forming collar as said plunger is rotated, said knives being of horizontally curved form and having flat horizontal lower edges and sharpened vertical leading edges arranged to move over the line of extrusion.

In testimony whereof I affix my signature.

GRANT H. HASERODT.